United States Patent [19]
Rybicki

[11] 4,084,668
[45] Apr. 18, 1978

[54] REDUNDANT DAMPER SEALS
[75] Inventor: Robert Charles Rybicki, Trumbull, Conn.
[73] Assignee: United Technologies Corporation, Hartford, Conn.
[21] Appl. No.: 584,238
[22] Filed: Jun. 5, 1975
[51] Int. Cl.² ............................................. F16F 9/20
[52] U.S. Cl. ..................... 188/312; 188/314; 188/318; 188/322; 277/59; 416/106
[58] Field of Search ............... 188/312, 314, 315, 322, 188/318; 416/106, 107, 140; 60/464; 277/3, 59

[56] References Cited
U.S. PATENT DOCUMENTS

| 2,122,045 | 6/1938 | Rose et al. | 60/464 |
| 2,334,115 | 11/1943 | Meredith | 188/314 X |
| 2,394,364 | 2/1946 | Christensen | 277/59 |
| 2,604,953 | 7/1952 | Campbell | 188/314 X |
| 2,755,872 | 7/1956 | Gerstenberger | 188/314 X |
| 3,110,367 | 11/1963 | Roberts | 188/312 X |
| 3,469,833 | 9/1969 | Suozzo | 188/314 X |
| 3,514,114 | 5/1970 | Monahan | 277/59 X |
| 3,636,708 | 1/1972 | Karman et al. | 60/464 X |
| 3,810,659 | 5/1974 | Marcil | 188/322 X |
| 3,925,987 | 12/1975 | Faisandier | 60/464 |
| 3,943,717 | 3/1976 | Schexnayder | 277/59 X |

FOREIGN PATENT DOCUMENTS

| 1,630,738 | 8/1971 | Germany | 188/322 |
| 6,403,323 | 9/1964 | Netherlands | 188/314 |

Primary Examiner—George E. A. Halvosa
Attorney, Agent, or Firm—Vernon F. Hauschild

[57] ABSTRACT

A cylinder-and-piston type hydraulic damper has spaced dual seals on its piston rods to provide annular cavities between seals. A fluid leakage line connects said cavities to the closed reservoir of a fluid leakage indicator which consists of a cylinder closed by a spring biased diaphragm which carries the indicating member of the indicator. The damper chambers on opposite sides of the piston are alternately supplied with fluid from the reservoir during operation of the damper by means of a shuttle valve, thus providing a closed and sealed fluid system including redundant seals with means for indicating that the damper needs servicing upon a predetermined loss of fluid from the reservoir.

1 Claim, 1 Drawing Figure

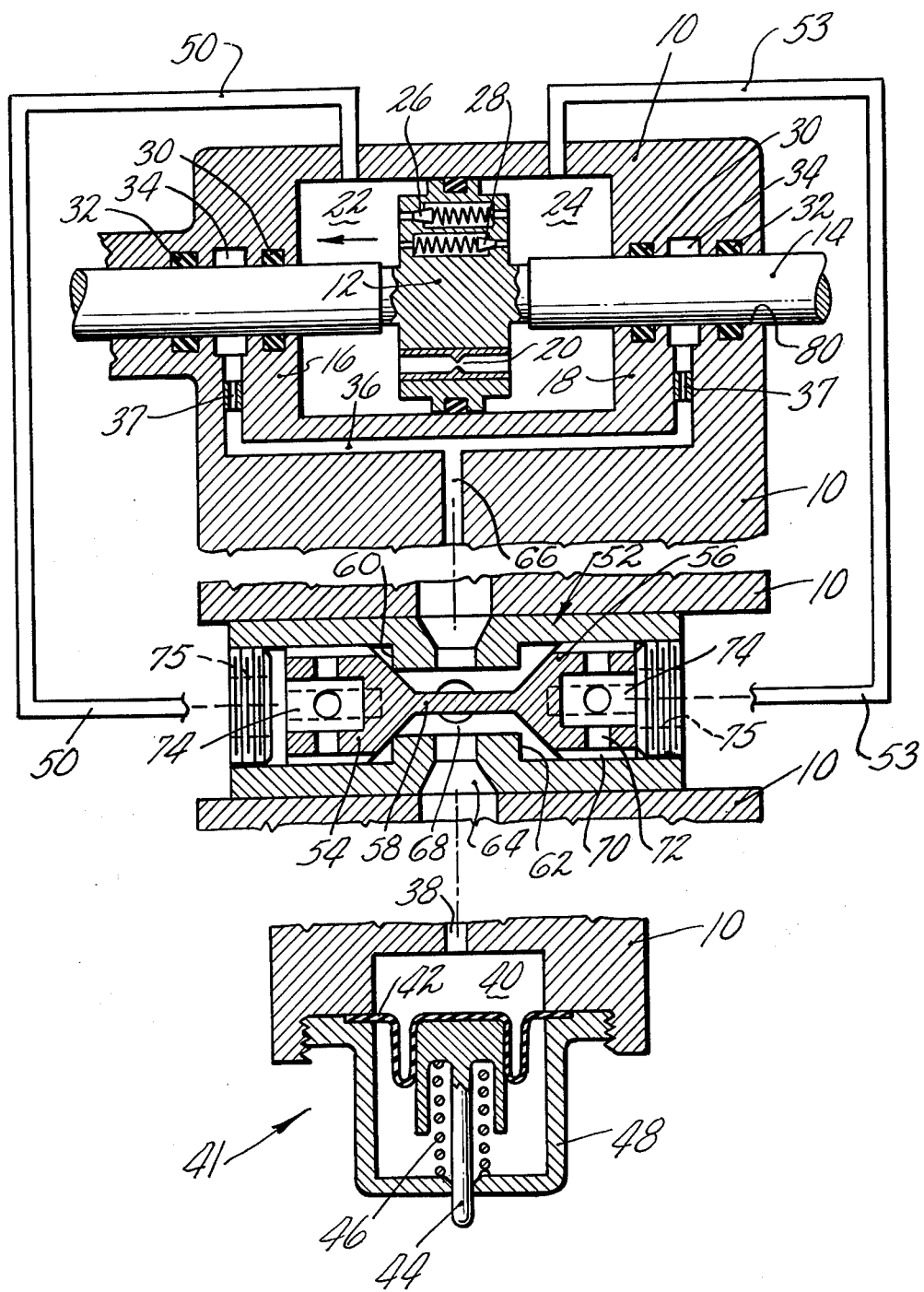

REDUNDANT DAMPER SEALS

The invention herein described was made in the course of or under a contract or subcontract thereunder with the Department of the Army.

BACKGROUND OF THE INVENTION

1. Field of the Invention

This invention relates to hydraulic dampers of the cylinder and piston type used for controlling the fore and aft movement of helicopter rotor blades in their plane of rotation. More particularly, this invention relates to means for providing redundant seals, a fluid reservoir, and a means for accurately indicating when the seals for the damper have become worn and are leaking excessively; all in a closely contained system.

2. Description of the Prior Art

Dual seals have been used on the shafts of dampers and servomotors and the like with fluid pressure indicators connected to the area between seals to indicate leakage past the primary seal. U.S. Pat. No. 1,943,578, issued January 16, 1934 to G. E. Bigelow et al shows such an arrangement applied to a high pressure centrifugal pump shaft. The area between the seals is connected by a conduit containing a restriction (valve) to a low pressure system and a pressure gage is connected to the conduit between the restriction and the seals. This arrangement proved objectionable because a pressure built up in the return line for the leakage fluid, thereby giving a false indication of leakage. In addition, this arrangement requires the use of external fluid lines, a separate reservoir and a pump to collect the fluie leakage and return it to the high pressure system. This arrangement is not optimally suited to a helicopter rotor application as the added complexity would hamper performance and limit reliability as well as increase cost and weight.

RELATED APPLICATIONS

An application of G. Bochnak, Ser. No. 584,237, and issued Aug. 3, 1976 as U.S. Pat. No. 3,972,396 filed concurrently with this application, shows a leaked-fluid indicator in an hydraulic system in which the difficulty of back pressure causing a false indication has been successfully overcome, but not within a closed, self-contained system exclusive of external lines, reservoir and pump.

SUMMARY OF THE INVENTION

It is an object of this invention to provide a hydraulic damper for controlling the lag-lead movements of helicopter rotor blades which greatly extends the service life of the damper between seal replacements.

More particularly it is an object of this invention to provide a damper of the cylinder and piston type in which the piston rods are provided with spaced primary and secondary seals for redundancy and means is provided for collecting fluid which leaks past the primary seals, conveying it to a closed reservoir provided with a fluid level indicator, and then returning the leaked fluid to the damper chambers by means of a shuttle valve, using the pumping action of the damper itself rather than an external or secondary pump.

A still further object of this invention is to provide a self-contained hydraulic damper which is sealed for life, requires no maintenance, and exhibits high reliability.

A yet further object of this invention is generally to improve the construction and performance of hydraulic dampers, absorbers, attenuators and similarly acting devices.

BRIEF DESCRIPTION OF THE DRAWING

The single FIGURE is a diagrammatic sectional showing of the improved damper and its leaked-fluid control system.

DESCRIPTION OF THE PREFERRED EMBODIMENT

In the drawing, 10 indicates the casing of the hydraulic damper and 12 indicates a piston reciprocable therein having a piston rod 14 that extends on opposite sides of the piston through the left and right-hand cylinder walls 16 and 18. It will be understood that the piston rod 14 has at its right-hand extremity an eye (not shown) by which it is connected to a helicopter rotor blade. The damper casing 10 is likewise extended at its other extremity and terminates in a similar eye (not shown) which is pivotally connected to the rotor head. This structure is shown in the copending Bochnak application, previously mentioned, and reference is made thereto for a showing of the damper installation details. Damper piston 12 has the usual restriction 20 permitting limited fluid flow between damper chambers 22, 24 as the piston reciprocates relative to casing 10. Oppositely opening pressure relief valves 26, 28 are provided which open upon opposite movements of the piston under excessive pressure conditions in the chambers.

End walls 16, 18 of the damper casing are each provided with spaced primary and secondary, i.e., first and second, seals 30, 32 about piston rod 14 with a small annular cavity 34 surrounding rod 14. These cavities are provided to collect fluid which leaks past primary seals 30 during operation of the damper. Cavities 34 are connected by a cored passage 36 which includes restriction 37 and which communicates with another cored passage 66 leading to inlet chamber 68 of a shuttle valve 52 in the damper casing and thence through cored passage 38 to reservoir 40. Reservoir 40 is a part of the damper indicator generally indicated at 41 and is closed by a diaphragm 42 which carries a fluid level indicator 44. A compression spring 46 surrounding indicator member 44 rests at one end on a cover 48 and at its other end on member 44, thus exerting pressure against diaphragm 42 to maintain a slight pressure in the leaked fluid at all times. This serves amoung other things to assure lubrication of seals 30, 32. Piston 12, shuttle valve 52, and reservoir 40 of damper indicator 41 are herein all contained within damper casing 10, forming a compact, self-contained, completely closed unit without external sumps and pumps which is particularly important when it is considered that as many as seven damper units must be located between as many blades and the rotor hub of some present day helicopters.

As the damper moves, for example, to the left as indicated by the arrow, pressure in chamber 22 is increased and this increased pressure is transmitted through conduit 50 to shuttle valve 52 which is enclosed in a cored chamber within damper chamber casing 10. A similar conduit 53 connects the right-hand chamber 24 with the shuttle valve. The shuttle valve is a spool valve comprising essentially two spaced value members 54, 56 connected by a short shaft 58 and seating on alternately engageable seats 60, 62 respectively as the shuttle valve is reciprocated by pressure from damper chambers 22, 24. The shuttle valve has a central fluid port 64 which is connected by cored passage 66 with passage 36 containing leaked fluid. Fluid entering the shuttle valve through port 64 flows into central chamber 68 and, depending upon which valve member is off its seat, flows through splined openings 70 in the open valve member into radial passages 72 and thence through the axial passages 74, 75 into conduit 50 or 53. The shuttle valve is symmetrical so it is unnecessary to trace the flow in the opposite direction.

In the normal operation of the damper system above described, the primary seals 30 will feel the full damper pressure during the first phase of its service life. Normal seal wear will eventually allow some slight amount of fluid, usually oil, to weep past this seal into the annular areas, or cavities, 34 between the primary and the secondary seals. This weepage is not lost from the damper system since annulus 34 is connected to reservoir 40 of the indicator via conduits 36, 66, 38. Thus, it will be noted, a closed damper system is provided. Throughout the normal life of the primary seals this weepage will gradually increase in rate and will continue to be returned to the reservoir at the same low pressure as long as the primary seal can hold back the high damper pressure. During the lifetime of the primary seals the secondary seals will wear at a very much reduced rate or perhaps not at all since they feel only the very low pressure supplied by spring 46 and are lubricated by fluid from reservoir 40.

When a primary seal finally fails and it can no longer support the damper pressure, fluid flow past the primary seal will increase to the extent that restrictor 37 will cause the damper pressure of chambers 22, 24 to build up and be felt by secondary seals 32. Thus the last phase of the damper service life begins. The secondary seal, when it is finally called upon, will be, for all intents and purposes, new and it will have remaining a 100% useful life. When in due course the secondary seal wears sufficiently to allow leakage, fluid will then be lost from the system by leakage past the secondary seal to atmosphere at, for example, point 80. This loss will be made up by the damper indicator as follows: Assuming the damper piston 12 to be moving to the left, fluid under high pressure will flow through passage 50 to shuttle valve 52 causing valve 54 to engage its seat 60. As the damper piston compresses the fluid in chamber 22, the pressure in chamber 24 will be reduced. Fluid supplied by reservoir 40 will then flow through passage 38, enter port 64 and flow through valve member 56, which is open, through splined passages 70 into radial passages 72 and thence out through axial passages 74, 75 into conduit 53 and into damper chamber 24. Similarly oil will be supplied to chamber 22 when the damper piston moves to the right. The slight positive pressure maintained on the low pressure side of piston 14 by reservoir 40 will prevent any air from being drawn into damper chambers 22, 24 past failed seals 32, 30. Any air in damper chambers 22, 24 would adversely affect damper performance by producing an irregular force/velocity response.

When sufficient fluid has been lost from the damper system through leakage past the secondary seals, damper indicator 41 will show the need for replenishing the supply of fluid in the system and replacing the seals. The redundant seals 32 at least double the useful life of the damper before maintenance is required. During the first phase of its life while the primary seals are working no fluid is lost from the system and no maintenance is required as at present. During the second phase of its life, fluid lost is automatically replenished from the reserve in the damper indicator 41 and again no maintenance is required. Finally, when both primary and secondary seals have failed and when fluid has diminished the reserve capacity in reservoir 40 to a previously set minimum, indicator member 44 will not show above cover 48. The damper will then be replaced at the first opportunity and sent back to overhaul for seal replacement.

The advantages of the damper system above described are extremely long life, no maintenance during this life, and a damper which in many cases is sealed for its life.

While I have shown and desribed one embodiment of my invention in considerable detail, I do not wish to be limited to the exact details described herein as many modifications will be readily apparent to those skilled in this art which fall within the scope of the following claims.

I claim:

1. A hydraulic damper of the type used in a high centrifugal field for controlling the lead-lag movements of a helicopter blade including a damper casing having a cylinder therein and a piston reciprocable in said cylinder forming with the latter a damper chamber on each side of the piston, a piston rod extended through the end walls of said cylinder, and means for at least doubling the service life of existing dampers of this type including a set of spaced high pressure seals in each of said end walls surrounding said piston rod and capable of resisting the high fluid pressure and fluid impact forces encountered in these dampers, each set including a first seal which acts to resist the high fluid forces of the damper during the first phase of the damper's service life and a second seal which acts to resist these forces during the last phase of the damper's service life, the space between the seals of each set forming a cavity for collecting any fluid which leaks past said first seal, means including a closed fluid reservoir for storing fluid leaked past said first seal, means for maintaining a low pressure fluid in said cavities during the first phase of the damper's service life including cored passages in said casing connecting said reservoir to each cavity, a fluid flow restriction in each of said passages, a shuttle valve having an inlet, and means for operating said shuttle valve by the pumping action of said damper for alternately supplying low pressure fluid from said reservoir to said damper chamber on the retreating side of said piston, said shuttle valve having its inlet connected to said reservoir and also to said cored passages on the side of said restrictions remote from said cavities.

* * * * *